United States Patent [19]

Veith et al.

[11] 4,213,072
[45] Jul. 15, 1980

[54] GAS DISCHARGE DISPLAY DEVICE INCLUDING WEB SHAPED SPACING ELEMENTS

[75] Inventors: Werner Veith, Heidelberg; Christian Stein, Munich, both of Fed. Rep. of Germany

[73] Assignee: Siemens Aktiengesellschaft, Berlin & Munich, Fed. Rep. of Germany

[21] Appl. No.: 956,640

[22] Filed: Nov. 1, 1978

[30] Foreign Application Priority Data

Nov. 11, 1977 [DE] Fed. Rep. of Germany ....... 2750587

[51] Int. Cl.$^2$ ..................... H01J 61/067; H01J 61/30; H01J 61/42
[52] U.S. Cl. ................................... 313/217; 313/220; 313/491
[58] Field of Search ............... 313/491, 493, 484, 485, 313/220, 217

[56] References Cited

U.S. PATENT DOCUMENTS

| | | |
|---|---|---|
| 3,800,186 | 3/1974 | Yamane et al. |
| 3,845,241 | 10/1974 | Schwartz |
| 3,885,195 | 5/1975 | Amano ..................... 313/485 X |
| 3,956,667 | 5/1976 | Veith |
| 3,992,644 | 11/1976 | Chodil et al. ..................... 313/491 X |
| 4,047,077 | 9/1977 | Veith |
| 4,112,329 | 9/1978 | Veith ............................... 313/493 X |

FOREIGN PATENT DOCUMENTS 2615681 10/1977 Fed. Rep. of Germany .
1210107 10/1970 United Kingdom .

*Primary Examiner*—Palmer C. Demeo
*Attorney, Agent, or Firm*—Hill, Van Santen, Steadman, Chiara & Simpson

[57] ABSTRACT

The invention relates to a gas discharge display device of the plasma panel type comprising a gas filled gas-tight enclosure which contains a front plate, a rear plate, and a control plate subdividing the interior of the enclosure into two chambers. The control plate bears, on its two sides, electrode paths which are capable of being actuated separately, and forming row and column conductors respectively, of a matrix, said control plate being perforated, together with these paths, at the intersection points of the matrix.

In order to keep the front plate at a minimal distance of approximately 1 mm relative to the control plate, according to the invention, web-shaped spacing elements with an essentially constant wall thickness are provided. The spacing elements extend in the plane of the control plate, are led past the perforations of the control plate, and run, alternating in sections, essentially parallel to, or at an angle, respectively, to the matrix conductors facing the front plate.

The invention finds application, especially, in the case of a plasma panel-type wherein a fluorescent screen is excited for light generation by means of high-energy electrons.

18 Claims, 5 Drawing Figures

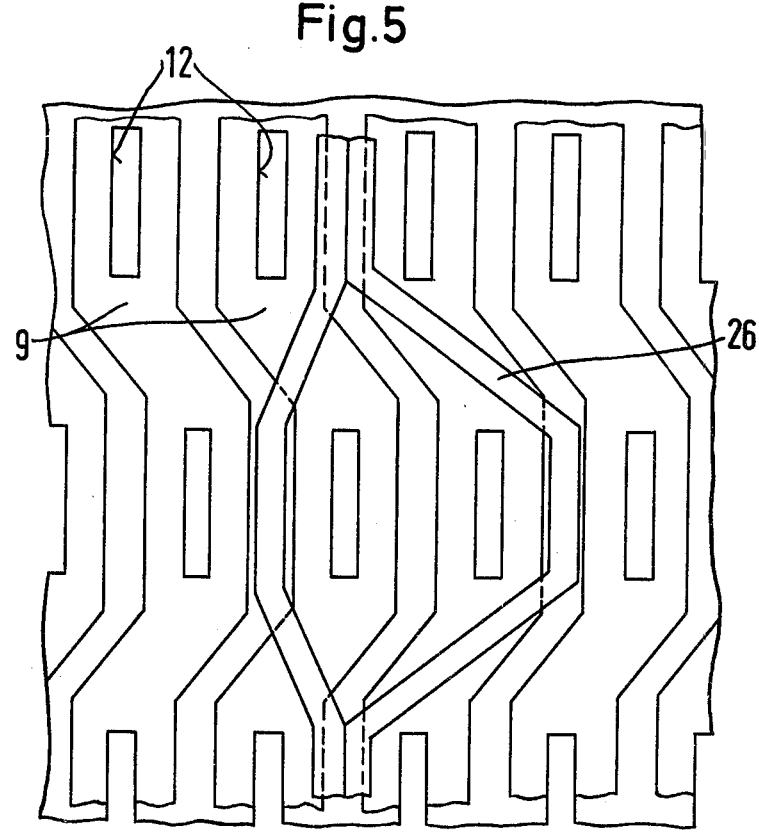

GAS DISCHARGE DISPLAY DEVICE INCLUDING WEB SHAPED SPACING ELEMENTS

BACKGROUND OF THE INVENTION

Gas discharge devices of the plasma panel type are known in the prior art which include a gas filled gastight enclosure having therein a front plate, a rear plate and a plate shaped control structure which sub-divides the interior of the enclosure into two chambers. See, for example, U.S. Pat. No. 4,112,329, assigned to the same assignee as the present invention. The control structure of this disclosure is a plate like matrix which has formed on an insulating plate on its two sides electrode paths which are separately actuatable and which are formed as rows and column conductors of a matrix. The control structure, together with these paths is perforated at the intersection points of the matrix. There is at least one plasma electrode (preferably a plate cathode running parallel to the control structure) in the gas discharge chamber of the enclosure, and there is also at least one post acceleration anode in the other enclosure chamber. A plasma electrode is arranged in such a manner that ignition in the gas discharge space may be brought about. The post acceleration electrode is kept, by means of spacing elements, at a minimal distance, relative to the electron paths, facing the post acceleration anode, of the control structure. Plasma panels are disclosed in the prior art in several variations. See, for example, German Auslegeschrift No. 1,811,272, German Offenlegungsschrift No. 2,412,869, U.S. Pat. No. 3,800,186, U.S. Pat. No. 3,845,241 and U.S. Pat. No. 4,112,329. These prior art disclosures operate according to the following principle. The plasma produced in the discharge space serves as the electron source. From this source, electrons are drawn into a post acceleration space by means of selectively actuating apertures in the control structure. There they consume energies of several kV, and finally impinge on the post acceleration anode, whereby a luminescent spot results in a luminescent layer placed in front of the anode. This light spot is particularly bright if the glow discharge according to German OS No. 2,412,869 burns in the form of a wedge-shaped longitudinal plasma between a plate cathode running parallel to a control plate and the respective activated rows of the control plate.

In the described dual chamber displays, primarily when they operate with a prismatic longitudinal discharge, what is of major importance is that the control structure maintain, over its entire surface a constant spacing of approximately 1 mm, relative to the post acceleration anode. Only then are the potential conditions provided that the anode penetration is identical at all openings of the control structure which enables the displays to be switched in a clean fashion at every image point with relatively low voltage.

The necessary spacing theoretically could be realized with a plate which is inserted between the front plate and the control structure and which contains holes which are in alignment with the control structure openings. However, practice has shown that such a plate, which still must be thicker than the control structure by a multiple thereof, cannot readily be provided with a plurality of fine perforations, and, accordingly, virtually does not enter into consideration, e.g., for a television picture screen.

For this reason, it has already been considered to suspend the control plate from the rear plate via small rods, or space said control plate relative to the front plate by means of pins, to mutually support against one another the two exterior plates by means of comb-like plates penetrating the control structure at individual locations (see U.S. Pat. No. 4,112,329, assigned to the same assignee as the present invention). Rod- or pin-technology, respectively, may achieve its purpose in the case of control structures with a plate-shaped electrode carrier; however, it is less suitable in the case of control units comprising an electrode substrate spaced between the row conductors (U.S. Pat. No. 4,112,329). In the case of structures with a covered carrier, it would be possible to change over to the supportplate variant; however, the assembly of the display does not work out very simply, and, in addition, a danger exists that the very thin prongs or tines may, under certain circumstances, yield to buckling.

SUMMARY OF THE INVENTION

The invention is confronted with the problem of producing a panel of the type initially cited wherein the extremely critical spacing between the front plate and the control structure is precisely obtained without any particular production outlay. In order to solve this problem, a gas discharge display device as referred to above is hereinafter disclosed in accordance with the present invention.

The inventively proposed web-shaped spacing elements fulfill their spacing function even under the most different mechanical stresses and deformations of the two parts to be spaced, particularly also in the case of sagging of the front plate brought about by external pressure. It is advantageous here that the electron currents entering the post acceleration space be virtually undisturbed by the web-shaped spacing elements, particularly that they not be noticeably deflected. This applies above all when the web-shaped spacing elements are provided with a certain surface conductivity which prevents harmful chargings. An additional advantage can be seen in that the webs collect a portion of the secondary electrons which are produced by the electron impact on the post acceleration anode and which activate the luminescent material surroundings.

Particularly favorable conditions develop if the webs are joined together into structures which are fixed (or rigid) per se. Self-supporting structures can be more readily handled and more comfortably secured in the correct positions. The size of such structures will generally be restricted by the thermal expansion differences between the individual partners; i.e., the front plate, the spacing structure, and the control structure. If, for example, the connecting pieces consist of ceramic, the individual spacing structures can cover only a relatively small surface area. A single spacing structure occupying the entire post acceleration space would be sufficient if all three of the cited parts consist of the same material, particularly a suitable glass. One preferred embodiment of a honeycomb or web consists of a rectangular structure formed of ceramic material. Another preferred form is "garland" or "festoon" structure consisting of two meandering glass webs, respectively, which is relatively simple to manufacture.

If the control structure is to be held in its position only through pressure and counter-pressure, then it must also additionally be stayed against the rear plate of the display. Expedient supporting provisions may be provided by support elements constructed as support plates and which extend in mutually parallel planes on which the row conductors are perpendicularly disposed. The support elements should, in each instance, be so placed that, in combined action with the spacing elements, they exert torques or shearing forces respectively, which are as low as possible on the control structure.

Additional advantageous embodiments and further developments of the invention are the subject of additional claims.

The invention is now to be described in greater detail on the basis of particularly preferred sample embodiments, with reference to the drawings. In the Figures, parts corresponding to one another are provided with the same reference signs.

BRIEF DESCRIPTION OF THE DRAWINGS

FIG. 5 illustrates the control structure with an additional embodiment of the spacing structure, likewise viewed from the front plate.

DESCRIPTION OF THE PREFERRED EMBODIMENTS

For reasons of clarity, the Figures are in part greatly simplified. All individual parts of a gas discharge panel, e.g., electrode supply lines or activating circuits, which are not absolutely necessary for an understanding of the invention, have been left undesignated or entirely omitted.

Figure 1:
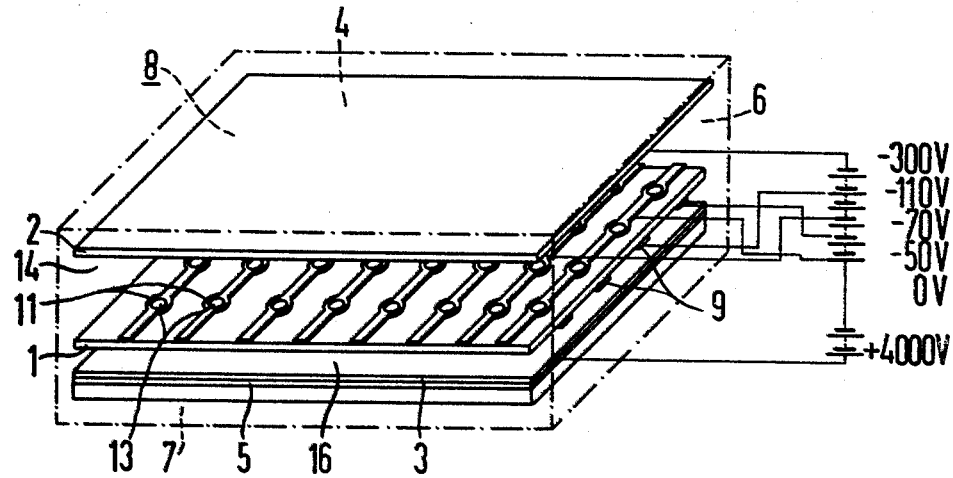
FIG. 1 illustrates the plate cathode, the control structure, and the post acceleration anode of a two-chamber display device, known from the German Offenlegungsschrift No. 2,413,869 (U.S. Pat. No. 4,112,329) in their spatial allocation and with their operating potentials.

In the prior art device shown in FIG. 1, without any support elements, a control plate 1 is arranged between a sheet cathode 2 on the one side, and between a similar sheet anode (post acceleration anode) 3. All three parts are mutually parallel and are disposed in the interior of a gas-tight enclosure 8 (indicated by broken lines) composed of a rear plate 4, lateral walls 6, and a front plate 7. The anode is applied on a luminescent layer 5 and is disposed, as viewed by the observer, in front of the control plate. The cathode is accordingly disposed behind the control plate. The front and rear side of the control plate are each respectively coated with mutually parallel conductor paths (column conductors) 55 which form control electrodes 9, and row conductors 11, respectively. Both conductor assemblages are provided at their intersection points with openings (column conductor openings 12, line conductor openings 13). The control plate is also provided with holes at the same locations, such that the control structure, consisting of the plate and the electrodes, contains a regular hole matrix. It is here pointed out that the allocation of the rows and columns to the cathode side or anode side electron paths, respectively, is arbitrary, and can, of course, also be transposed.

In operation of the display, the plate cathode is negatively biased by approximately 300 V relative to the respectively actuated line, and the actuated line is connected to ground potential. The remaining lines are biased to −40 to −100 V. The non-activated columns are negatively biased by approximately 100 to 120 V relative to ground, and are raised, upon actuation, to −50 V. The post acceleration anode is connected to several kV. The spacings between the individual electrodes are selected such that a normal glow discharge burns in the space between the plate cathode and the rows (gas discharge space 14), whereas, in the space between the post acceleration anode and the column conductors (post acceleration space 16), no plasma can be ignited on account of the minimal spacing.

Figure 2:
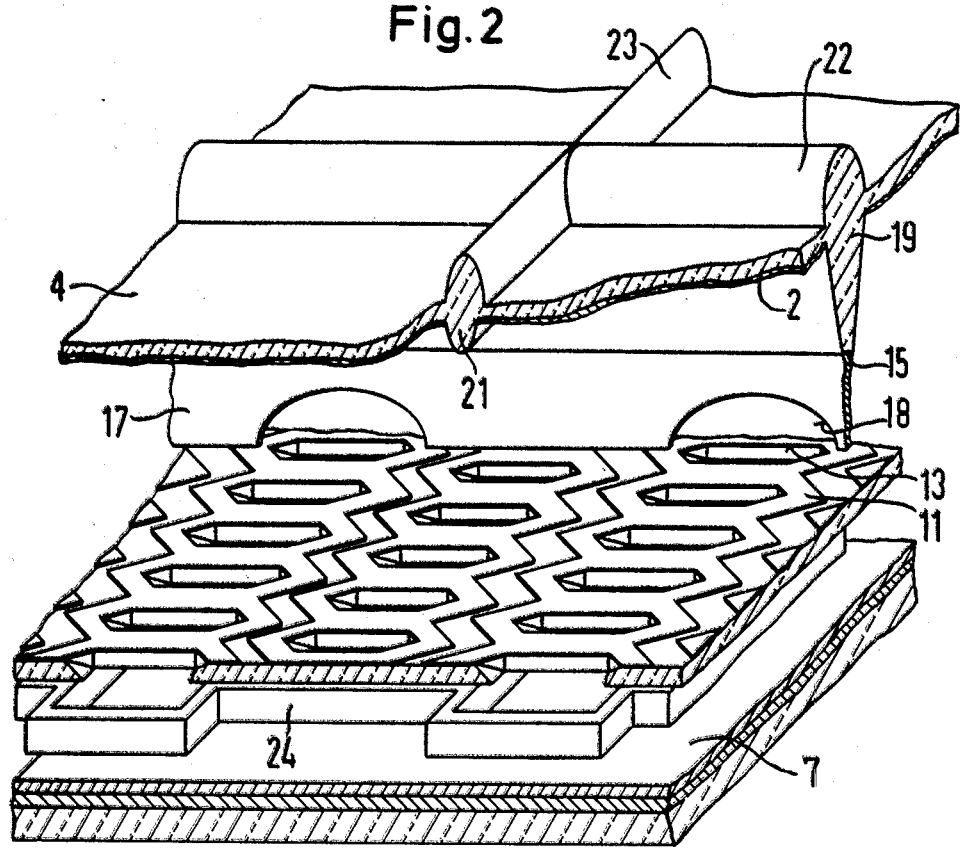
FIG. 2 illustrates a partially opened-up perspective view of the interior of the enclosure from a first preferred embodiment of the invention.
Figure 3:
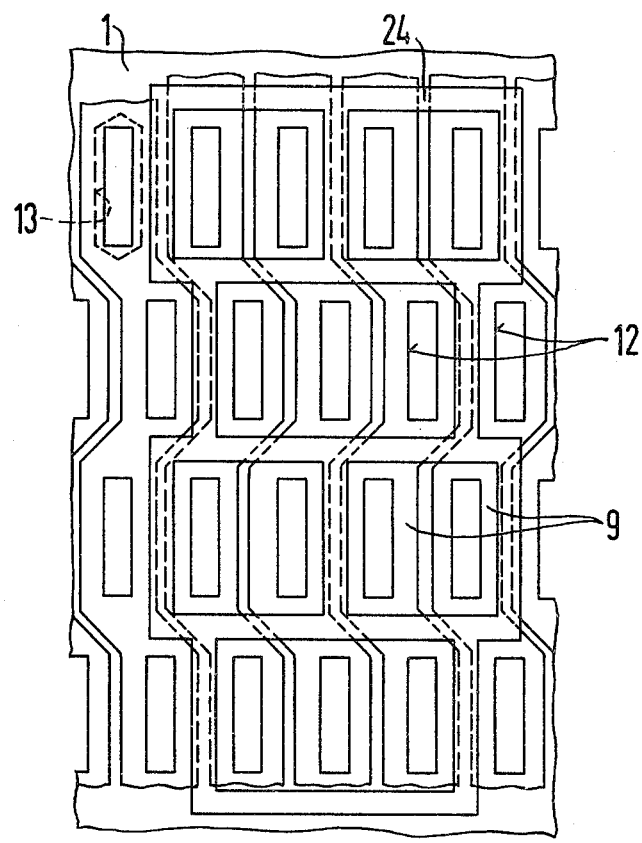
FIG. 3 illustrates the control structure and the spacing structure from FIG. 2, viewed from the front plate.

In the embodiment of FIGS. 2 and 3, which is provided for a television viewing screen, the gas discharge space is subdivided by a number of support plates 17 which extend between control structure 1 and the rear plate 4; namely, in planes relative to which the lines 11 are perpendicular. Each support plate is provided with an arcuated recess 18 at the location where it is intersected by a line conductor 13. The arch is bent or extended so far that, even if a conductive film should be deposited on the latter, it cannot bring about any short-circuit between adjacent line conductors.

The support plates 17 strike at the front directly against the control structure, and are accommodated at the rear, respectively, in a groove 15 of a longitudinal strut 19 projecting forward from the rear plate. These longitudinal struts serve the purpose of shortening the height of the thin support plates, on the one hand, and, in addition, contribute to the stabilization of the rear plate 14. In the present example, the longitudinal struts are in each instance additionally reinforced by a number of transverse struts 21 which proceed in regular spaced intervals from the longitudinal struts and are likewise shaped to the rear plate 4. The transverse ribs (or fins) of each longitudinal rib maintain a spatial interval (or spacing) relative to the respectively adjacent longitudinal rib, and are offset relative to their transverse ribs such that the rear plate base—the actual cathode—still forms a continuous surface and can be connected, via a single contact, to a voltage source. Instead of a construction with long longitudinal ribs and short transverse ribs, other rear plate profiles would, naturally, also be conceivable. However, it would also be possible to connect several longitudinal struts by means of transverse bars which would be secured in grooves in the rear plate. These transverse connections, of course, should only be relatively low, since they otherwise would disturb the plasma.

The rear plate is additionally reinforced on its exterior side by means of a strut-network consisting of longitudinal ribs 22 and transverse ribs 23. In the example of FIGS. 2 and 3, the stabilization elements have the following heights: in the case of a discharge space height of approximately 20 mm, the longitudinal struts are approximately 15 mm high, and the transverse struts are approximately 10 mm high. For the approximately 0.13 mm-thick support plates, there remains a height of approximately 5 mm. The grooves 15 in the longitudinal struts are substantially broader than the support plates, for example, 0.5 to 1 mm wide, in order that there is still a certain clearance available for the positioning of the supports. The reinforced rear wall consists of glass, as does the remaining enclosure. The entire glass body, as is customary in the case of conventional television tubes, is manufactured by means of a single compression operation. During compression, the sunk grooves or other indentations or recesses for the support plate mounting can also be simultaneously pressed in.

From FIG. 3, the form of the spacing structure located between the post acceleration anode and the control structure can be determined. Several struts are integrated into a spacing unit 24 with a plurality of rectangular recesses separated from one another in each instances by walls of the same thickness. A number of these honeycombed formations are distributed over the entire control structure. The walls of the honeycomb are a maximum of 200μ, preferably a maximum of 150μ thick, approximately 1 mm high, and consist of ceramic. The struts are inserted into (non-illustrated) grooves in the front plate 7, and are fixed with a glass solder.

The ceramic spacing structure comprises only relatively few openings of the control structure, since, otherwise, on account of the different expansion coefficients of glass and ceramic, given the prevailing operating temperatures, would come too close to the one or the other control structure opening.

Figure 4:
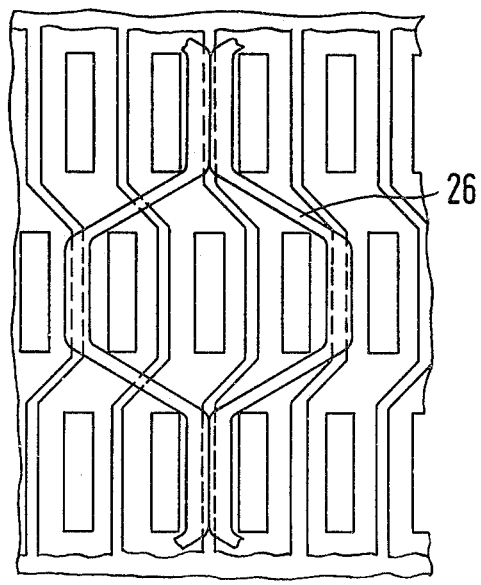
FIG. 4 illustrates, by the same method of illustration as in FIG. 3, the control structure with a modified spacing structure.

FIG. 4 illustrates a spacing structure wherein two meandering struts are combined in a mirror-inverted fashion, such that a longitudinally-extended structure with alternating bulgings and constrictions results. A "garland" of this type, referenced 26, can be particularly economically fabricated: glass bands of a suitable width and thickness (for example, 1 to 2 mm in height, 150μ thick) are conveyed in a deformable state between two toothed wheels and two of these bands are then cemented together by means of thermal treatment. Garland (or festoon)-structures are also capable of being utilized when the electrode substrate of the control structure between the row conductors according to the U.S. Pat. No. 4,112,329 is removed. In this instance, of course, the garlands will be provided with an asymmetrical construction; namely, such that the glass struts are covered by the oblique sections of the column conductors, on the one hand, and by the row conductors leading to the cathode, on the other hand (FIG. 5).

From FIG. 4, it is apparent that the vertical sections of the struts run very closely by the control line openings and hence by the electron beam. Charges on the struts could lead to deflections of the beam and hence to a poor illumination of the fluorescent screen spots. Accordingly, it is expedient to provide the strut material with a very specific conductivity value which is different from that of the insulating base material. This value must be so low that the energy consumption of the applied high voltage source remains minimal; however, it must be so high that at least the charges resulting during the recording of a line have faded out or decayed, or died out without a trace until the return of the beam to the same line.

The invention is not restricted to the illustrated sample embodiments. Thus, the expert is, above all, at liberty to also use other forms and insulating materials in addition to a honeycombed- or garland-structure consisting of ceramic, or glass, respectively. He only need exercise precaution here to be assured that the struts have the required "zig-zag" pattern, that they leave the conductor matrix perforations be completely free, even under operating temperatures, and that they be of equal thickness everywhere, if possible, with the possible exception of the nodal points of the strut structure.

It will be apparent to those skilled in the art that many modifications and variations may be effected without departing from the spirit and scope of the novel concepts of the present invention.

We claim as our invention:

1. Gas discharge display device comprising a gas filled gas-tight enclosure having a front plate, a rear plate and a plate-shaped control structure sub-dividing the interior of said enclosure into a gas discharge chamber and a post acceleration chamber, said plate-shaped control structure having mutually parallel elongated conductors on each side forming a matrix with row electrodes and column electrodes, said row electrodes facing the gas discharge chamber and said column electrodes facing the post accelerating chamber, said control structure being perforated in the intersection points of said matrix, said gas discharge chamber including at least one plasma electrode running parallel to said control structure, said post accelerating chamber including one post acceleration anode and spacing elements separating said post acceleration anode from said column electrodes by a minimal distance, said distance being such that a voltage of several kV will still fail to trigger a gas discharge, said spacing elements comprising struts with a wall thickness which is substantially constant, said struts extending in the plane of said control structure and being conveyed past said perforations of said control structure and running alternatively in sections, essentially parallel to said column and at an angle relative to the column conductor extension, respectively, said struts being electrically conductive, at least at their surface, such that a strut charging—which may possibly be produced by an electron beam entering said post acceleration chamber—will have faded away again until the next possible return of said electron beam.

2. Device according to claim 1, in which a plurality of struts are secured together into one spacing structure which contains a number of openings framing at least one control structure perforation, respectively, said openings being separated from one another by said struts.

3. Device according to claim 2, in which the openings of said spacing structure form a rectangular honeycombed-spacing structure.

4. Device according to claim 2, in which the spacing structure consists of two struts, provided with a meandering structure, and disposed in a mirror-inverted fashion relative to one another with alternating bulgings and constrictions.

5. Device according to claim 1, in which said struts consist of ceramic.

6. Device according to claim 1, in which said struts consist of glass.

7. Device according to claim 1, in which said individual struts have a maximum wall thickness of 200μ.

8. Device according to claim 1, in which said individual struts have a maximum wall thickness of 150μ.

9. Device according to claim 1, in which the surface of said struts are electrically conductive, such that a strut charging—which may possibly be produced by an electron beam entering said post acceleration chamber—will have faded away again until the next possible return of said electron beam.

10. Device according to claim 1, having support elements between said control structure and the rear plate, in which said support elements are constructed as support plates, and extend in mutually parallel planes on which said row electrodes are perpendicularly disposed.

11. Device according to claim 1, in which said front and said rear plates contain grooves on their side, respectively, facing said control structure, in which grooves said struts are inserted.

12. Device according to claim 1, in which said front and said rear plates contain grooves on their side, respectively, facing said control structure, in which grooves said support plates are inserted.

13. Device according to claim 1, in which said struts and said front and rear support plates are secured together by means of a glass solder.

14. Device according to claim 10, in which said support plates are connected with one another on their rear plate end side by means of longitudinal projections running parallel to said row electrodes, said projections extending particularly from said rear plate.

15. Device according to claim 10, in which said support plates are accommodated at their rear plate end side in a longitudinal strut, respectively which longitudinal struts extend from said rear plate.

16. Device according to claim 15, in which said transverse struts, respectively, extend from said longitudinal struts, which transverse struts are likewise molded onto said rear plate, and maintain a spacing relative to the adjoining transverse struts.

17. Device according to claim 15, in which said transverse struts, respectively, extend from said longitudinal struts, which transverse struts are likewise molded onto said rear plate, and maintain a spacing relative to the adjoining longitudinal struts.

18. Device according to claim 1, in which said rear plate is provided on its exterior side with a skeletal structure consisting of longitudinal and transverse ribs extending from said plate.

* * * * *